United States Patent [19]

Kagawa

[11] Patent Number: 4,878,974

[45] Date of Patent: Nov. 7, 1989

[54] METHOD OF PRODUCING A GAS-PERMEABLE, WATERPROOF COMPOSITE SHEET

[75] Inventor: Seiji Kagawa, Yokohama, Japan

[73] Assignee: Tonen Sekiyukagaku Kabushiki Kaisha, Tokyo, Japan

[21] Appl. No.: 306,178

[22] Filed: Feb. 6, 1989

[30] Foreign Application Priority Data

Feb. 5, 1988 [JP] Japan .................................. 63-25200
Aug. 25, 1988 [JP] Japan ................................ 63-211118
Sep. 16, 1988 [JP] Japan ................................ 63-231900

[51] Int. Cl.$^4$ ............................................. B32B 31/20
[52] U.S. Cl. ..................................... 156/85; 156/160; 156/163; 156/164
[58] Field of Search ................... 156/84, 85, 160, 163, 156/164

[56] References Cited

U.S. PATENT DOCUMENTS 3,741,841 6/1973 Toyoda et al. ....................... 156/163
3,959,051 5/1976 Schirmer .............................. 156/164

Primary Examiner—Caleb Weston
Attorney, Agent, or Firm—Armstrong, Nikaido, Marmelstein, Kubovcik & Murray

[57] ABSTRACT

A method of producing a waterproof, gas-permeable composite sheet comprising the steps of: (a) preparing a film from a composition comprising 40–70 weight % of an ethylene-propylene-diene copolymer and 30–60 weight % of an ethylene-vinyl acetate copolymer; and (b) adhering the film to a woven or nonwoven fabric by hot pressing while causing the heat shrinkage of the film simultaneously, thereby making the film microporous. The composition may further contain linear low-density polyethylene to improve film-forming properties. By subjecting the hot-pressed composite sheet to a plurality of heating-cooling steps, it is provided with high heat resistance. In addition, by foaming the film and hot-pressing it to a stretchable woven or nonwoven fabric and then stretching, the composite sheet is further provided with high stretchability.

24 Claims, 4 Drawing Sheets

METHOD OF PRODUCING A GAS-PERMEABLE, WATERPROOF COMPOSITE SHEET

BACKGROUND OF THE INVENTION

The present invention relates to a method of producing a waterproof, gas-permeable composite sheet, and more particularly to a method of producing a waterproof, gas-permeable composite sheet having not only good softness but also high mechanical strength and desirably high heat resistance and stretchability.

Sheets and films having good waterproofness and gas permeability have come to be widely used as leak-preventive sheets for disposable diapers, etc., in recent years.

Such gas-permeable films are generally produced by blending polyolefin resins with inorganic fillers, melting and forming them into films and then stretching them uniaxially or biaxially to provide them with micropores. In such gas-permeable films, extremely small fractures are produced at points of inorganic fillers by stretching, resulting in the formation of gas-permeable pores of 1–4 μm or so.

However, such gas-permeable films do not have sufficient gas permeability, and because of their rigidity inherent in stretched polyolefin films, they give paper-like touches so that they are not suitable for applications requiring softness.

It was also proposed to produce a soft, porous film by adding to polyolefin resins inorganic fillers and low-melting point polymers of the same types, rubbery polymers, olefinic thermoplastic elastomers, etc. However, the resulting films are still insufficient in gas permeability and poor in strength.

Therefore, various proposals to provide softness to stretched gas-permeable films made of polyolefin resins and inorganic fillers. For instance, Japanese Patent Laid-Open No. 60-257221 discloses a method of producing a soft, porous film by extruding in a molten state a composition comprising 100 parts by weight of a polyolefin resin, 25–400 parts by weight of a filler, and 1–100 parts by weight of a liquid or waxy hydrocarbon polymer or a mixture of the hydrocarbon polymer and an epoxy group-containing organic compound, and then stretching the resulting film biaxially.

Further, Japanese Patent Laid-Open No. 62-10141 discloses a method of producing a porous film or sheet by forming a film or sheet from a composition comprising a polyolefin resin, a filler and a triglyceride in a molten state, and stretching the film or sheet.

Further, Japanese Patent Laid-Open No. 62-27438 discloses a method of producing a gas-permeable film by at least uniaxially stretching a film made of a composition comprising 42–87 volume % of a polyolefin resin and 58–13 volume % of an inorganic filler, the polyolefin resin being a mixture of 50–95 weight % of linear low-density polyethylene and 50–5 weight % of branched low-density polyethylene, and the composition containing 3–25 parts by weight, per 100 parts by weight of the composition, of an aliphatic alcohol-aliphatic acid ester which is a compound of aliphatic acid having 10–22 carbon atoms and aliphatic alcohol having 1–12 carbon atoms.

Further, Japanese Patent Laid-Open No. 58-149303 discloses a microporous film as a liquid-impermeable, leak-proof sheet to be integrally laminated with an absorbant for disposable diapers, which is produced by blending a composition comprising 100 parts by weight of a polyolefin resin, 28–200 parts by weight of a filler and 10–70 parts by weight of a liquid or waxy polyhydroxy saturated hydrocarbon formed by the hydrogenation of liquid polybutadiene having hydroxide end groups, forming the composition into a film and then stretching it by 1.2 times or more at least uniaxially to provide it with micropores.

However, since any of the above gas-permeable films are produced by stretching, they are thin and so poor in mechanical strength. Accordingly, they are often used in combination with other materials. Thus, secondary processing is often needed, leading to the increase of their prices. In addition, since they do not contain rubber materials, they are poor in softness.

In view of these problems, the inventor previously found that a gas-permeable composite film having high mechanical strength and good softness can be obtained by hot-pressing a stretched film made of a composition comprising a crystalline polyolefin resin, a rubber polymer and a filler to a mesh-like sheet at a temperature equal to or higher than a temperature at which the heat shrinkage of the stretched film initiates, to adhere the stretched film to the mesh-like sheet and simultaneously causing the heat shrinkage of the stretched film, thereby making the stretched film microporous, and filed a patent application for such a gas-permeable composite film in Japan (Japanese Patent Application No. 62-170497).

This gas-permeable composite film has not only excellent softness but also excellent mechanical strength and gas permeability. However, recently further improved waterproofness, gas permeability and softness are required for sheets of disposable diapers, sports wear, etc. However, since the above composite film is based upon polyolefin, it is not necessarily satisfactory in softness for the above applications. In addition, in the above applications, good stretchability is often desired.

Moreover, recently, heat resistance has become an important requirement for gas-permeable composite films so that they are not burned or scorched even by direct contact with a lighted cigarette, etc. To improve the heat resistance of the composite films, it is preferable to cause the cross-linking of such components as an ethylene-propylene-diene copolymer and an ethylene-vinyl acetate copolymer in the films, but a simple heat treatment leads to the melting of the films so that the films lose their micropores. In addition, in the heat treatment process, unacceptable odor may be generated. It is possible to carry out the cross-linking of the films only by irradiating electron beam, but the irradiation of electron beam may cause molecular scission which in turn causes the generation of strong odor (acetic acid odor).

OBJECT AND SUMMARY OF THE INVENTION

Accordingly, an object of the present invention is to provide a method of producing a gas-permeable, waterproof composite sheet having excellent softness.

Another object of the present invention is to provide a method of producing a gas-permeable, waterproof composite sheet having not only excellent softness and mechanical strength but also high heat resistance without odor.

A further object of the present invention is to provide a method of producing a gas-permeable, waterproof composite sheet having excellent stretchability.

As a result of intense research in view of the above objects, the inventor has found that the hot pressing of a film made of a composition comprising an ethylene-propylene-diene copolymer and an ethylene-vinyl acetate copolymer to a woven or nonwoven fabric serves to provide the film with micropores, thereby producing a gas-permeable, waterproof composite sheet with excellent softness.

Further, the gas-permeable, waterproof composite film can be provided with heat resistance by conducting the cross-linking of the film by repeating a plurality of heating-cooling steps with the heating temperature increased stepwise.

Further, by hot-pressing a foamed film made of a composition comprising an ethylene-propylene-diene copolymer, an ethylene-vinyl acetate copolymer and a foaming agent to a stretchable woven or nonwoven fabric, and then stretching the resulting composite film uniaxially or biaxially along the stretchable direction, stretchability is given to the gas-permeable, waterproof composite sheet.

Thus, the method of producing a waterproof, gas-permeable composite sheet according to one embodiment of the present invention comprises the steps of (a) preparing a film from a composition comprising 40–70 weight % of an ethylene-propylene-diene copolymer and 30–60 weight % of an ethylene-vinyl acetate copolymer; and (b) adhering the film to a woven or nonwoven fabric by hot pressing while causing the heat shrinkage of the film simultaneously, thereby making the film microporous.

The method of producing a waterproof, gas-permeable composite sheet according to another embodiment of the present invention comprises the steps of (a) preparing a film from a composition comprising 35–68 weight % of an ethylene-propylene-diene copolymer, 30–55 weight % of an ethylene-vinyl acetate copolymer and 1–20 weight % of linear low-density polyethylene: and (b) adhering the film to a woven or nonwoven fabric by hot pressing at a temperature of 70°–150° C. while causing the heat shrinkage of the film simultaneously, thereby making the film microporous.

The method of producing a heat-resistant, gas-permeable composite sheet according to a further embodiment of the present invention comprises the steps of (a) stretching a film made of an ethylene-propylene-diene copolymer and an ethylene-vinyl acetate copolymer uniaxially or biaxially: (b) adhering the resulting stretched film to a woven or nonwoven fabric by hot pressing while causing the heat shrinkage of the stretched film simultaneously, thereby making the film microporous; and (c) repeating a plurality of steps of heating the film at such a temperature that the film is not melted and then cooling it, the heating temperature being elevated stepwise from one step to a subsequent step, thereby causing the cross-linking of the film while retaining the microporosity of the film.

The method of producing a stretchable, waterproof, gas-permeable composite sheet according to a still further embodiment of the present invention comprises the steps of (a) preparing a foamed film from a composition comprising 40–70 weight % of an ethylene-propylene-diene copolymer, 30–60 weight % of an ethylene-vinyl acetate copolymer, and 0.1–1.0 parts by weight of a foaming agent per 100 parts by weight of the ethylene-propylene-diene copolymer + the ethylene-vinyl acetate copolymer; (b) adhering the foamed film to a stretchable woven or nonwoven fabric by hot pressing: and (c) stretching the resulting composite sheet along the stretchable direction of the stretchable woven or nonwoven fabric, thereby providing the foamed film with micropores penetrating therethrough.

The method of producing a stretchable, waterproof, gas-permeable composite sheet according to a still further embodiment of the present invention comprises the steps of (a) preparing a foamed film from a composition comprising 35–65 weight % of an ethylene-propylene-diene copolymer, 30–55 weight % of an ethylene-vinyl acetate copolymer, 1–10 weight % of linear low-density polyethylene, and 0.1–1.0 parts by weight of a foaming agent per 100 parts by weight of the ethylene-propylene-diene copolymer + the ethylene-vinyl acetate copolymer + the linear low-density polyethylene; (b) adhering the foamed film to a stretchable woven or nonwoven fabric by hot pressing: and (c) stretching the resulting composite sheet along the stretchable direction of the stretchable woven or nonwoven fabric, thereby providing the foamed film with micropores penetrating therethrough.

BRIEF DESCRIPTION OF THE DRAWINGS

FIG. 8 (b) is an enlarged cross-sectional view showing the film adhered to fibers, which is stretched so that micropores in the foamed film are interconnected to produce gas-permeable pores.

DETAILED DESCRIPTION OF THE INVENTION

Figure 1:
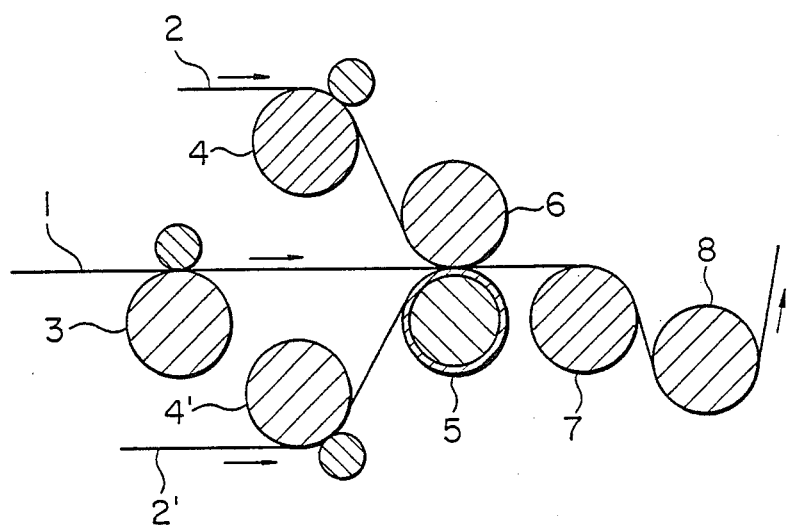
FIG. 1 is a schematic view showing an apparatus for carrying out the method of producing a composite film according to one embodiment of the present invention.

The ethylene-propylene-diene copolymer (EPDM) used in the present invention means a copolymer containing a repeating unit derived from ethylene, a repeating unit derived from propylene and a repeating unit derived from a diene compound. The diene compound includes ethylidenenorbornene, 1,4-hexadiene, dicyclopentadiene, etc.

The ethylene-propylene-diene copolymer (EPDM) used in the present invention is preferably composed of 60–70 mol % of the repeating unit derived from ethylene, 30–40 mol % of the repeating unit derived from propylene and 1–10 mol % of the repeating unit derived from the diene compound. More preferably, the ethylene repeating unit is 62–66 mol %, the propylene repeating unit is 33–37 mol %, and the diene compound repeating unit is 3–6 mol %.

The number-average molecular weight of the ethylene-propylene-diene copolymer is preferably 400,000–600,000 and its density is preferably 0.87 g/cm$^3$ or less. Further, its melt index (190° C., 2.16 kg load) is preferably in the range of 0.1–5.0 g/10 minutes, and more preferably 0.30–1.0 g/10 minutes, and further preferably 0.35–0.50 g/10 minutes.

The ethylene-propylene-diene copolymer used in the present invention consists essentially of the above repeating units, but it may further contain additional repeating units derived from α-olefins such as butene-1,4-methylpentene-1, etc., within such a range as not to deteriorate the properties of the copolymer.

The ethylene-vinyl acetate copolymer (EVA) used in the present invention means a copolymer having 7.5 weight % or more of a vinyl acetate repeating unit. Particularly preferable in the present invention is an ethylene-vinyl acetate copolymer having the vinyl acetate repeating unit content in the range of 7.5–30 weight %.

The ethylene-vinyl acetate copolymer (EVA) used in the present invention preferably has a number-average molecular weight of 12,000–14,000. Such copolymer has a melt index of 15–20 g/10 minutes (190° C., 2.16 kg load).

The composition used in the present invention may further contain linear low-density polyethylene (LLDPE) which is a linear polyethylene having a less branched structure. Its specific gravity is preferably in the range of 0.920–0.935.) Such linear low-density polyethylene (LLDPE) usually has a melt index of 0.5–3.0 g/10 minutes (190° C., 2.16 kg load).

In order to produce a waterproof, gas-permeable composite sheet, the content of the ethylene-propylene-diene copolymer (EPDM) is 40–70 weight %. When the ethylene-propylene-diene copolymer (EPDM) is less than 40 weight %, the resulting film does not have sufficient elasticity, and when it exceeds 70 weight %, the film does not have good formability and softness. The preferred content of the ethylene-propylene-diene copolymer is 55–65 weight %.

The content of the ethylene-vinyl acetate copolymer (EVA) is 30–60 weight %. When the content of the ethylene-vinyl acetate copolymer (EVA) is less than 30 weight %, the composition does not have good formability and the resulting film does not show good softness. On the other hand, when it exceeds 60 weight %, the film shows too much stickiness, making its handling difficult. The preferred content of the ethylene-vinyl acetate copolymer (EVA) is 35–45 weight %.

When the linear low-density polyethylene (LLDPE) is contained in the composition, its content is generally 1–20 weight %. When the content of the linear low-density polyethylene (LLDPE) is less than 1 weight %, sufficient effect of improving the formability of the film cannot be obtained. On the other hand, when it exceeds 20 weight %, the resulting film shows poor softness and stretchability. Incidentally, when the linear low-density polyethylene is contained, the content of the ethylene-propylene-diene copolymer is usually 35–68 weight %, and the content of the ethylene-vinyl acetate copolymer is 30–55 weight %.

In the present invention, the composition may further contain, in addition to the above resin components, anti-oxidants, ultraviolet absorbers, anti-statics, colorants, etc.

In the present invention, to easily achieve the microporous structure of the film and to provide the film with good anti-blocking properties, the composition may contain fillers.

Examples of the fillers usable in the present invention include talc, calcium carbonate, gypsum, carbon black, clay, kaoline, silica, diatomaceous earth, magnesium carbonate, barium carbonate, magnesium sulfate, barium sulfate, calcium sulfate, calcium phosphate, aluminum hydroxide, zinc oxide, magnesium hydroxide, calcium oxide, magnesium oxide, titanium dioxide, alumina, mica, vitreous volcanic balloons, zeolite, silica clay, cement, silica fume and micaceous flour. Among the above fillers, talc proves to be most desirable. The average particle diameter of such a filler is required not to exceed 5 μm, and is desired to fall in the range of 1–3 μm.

When the filler is contained, the film composition of the present invention comprises 40–70 weight % of the ethylene-propylene-diene copolymer, 30–60 weight % of the ethylene-vinyl acetate copolymer and 5–15 weight % of the filler.

The composition composed of the ethylene-propylenediene copolymer (EPDM), the ethylene-vinyl acetate copolymer (EVA) and optionally the linear low-density polyethylene (LLDPE) and/or the filler is uniformly blended by a Banbury mixer, a biaxial kneading machine, etc.

The blended composition can be formed into a film by a suitable known method such as an inflation method using a circular die, a T-die method using a T-die, etc.

The film is then adhered to a woven or nonwoven fabric by hot pressing. The woven or nonwoven fabrics used in the present invention include any materials which have not only sufficiently large voids or pores but also large mechanical strength as supports for the gas-permeable composite sheets. Specifically, they include not only usual woven or nonwoven fabrics, but also knits, papers and other highly porous sheets. Particularly preferable among others are unwoven fabrics such as spun bond unwoven fabrics, plain weave fabrics such as gauzes, etc. The nonwoven fabrics need not be made of long staple fibers but may be made of short fibers intertwined or spot-fused with each other.

The adhesion of the film to the woven or nonwoven fabric by hot pressing is generally carried out at a temperature of 70°–150° C. under pressure of 0.1–10 kg/cm$^2$. Though the temperature and pressure ranges are more or less variable with the composition of the film and the type of the woven or nonwoven fabric, too low temperature and pressure cannot act to adhere the film to the woven or nonwoven fabric sufficiently, and too high temperature and pressure lead to the decrease in waterproofness of the resulting composite sheet.

More specifically, the hot pressing is conducted preferably at 80°–150° C. on the side of the woven or nonwoven fabric and at 75°–95° C. on the side of the film under pressure of 1.0–10 kg/cm$^2$. Particularly, it is conducted at 110°–130° C. on the side of the woven or nonwoven fabric and at 85°–95° C. on the side of the film, under pressure of 5–10 kg/cm$^2$.

The hot pressing of the film to the woven or nonwoven fabric is preferably carried out by using a heat roll. In the hot pressing, various arrangements of the film and the woven or nonwoven fabric are possible. Specifically, one film can be adhered to one woven or nonwoven fabric. And one film can be sandwiched by two woven or nonwoven fabrics. In addition, one woven or nonwoven fabric can be sandwiched by two films.

In the production of the heat-resistant composite sheet from a film made of a composition comprising an ethylene-propylene-diene copolymer and an ethylene-vinyl acetate copolymer, the film is stretched before being adhered to the woven or nonwoven fabric by hot pressing. The stretching of the film can be conducted uniaxially or biaxially. In the case of uniaxial stretching, it can be carried out by means of rolls by one step or by a plurality of steps. In the case of biaxial stretching, a tenter can be used to conduct the successive stretching or simultaneous (in two directions) stretching of the film. In any case, the stretch ratio is 1.5 times or more, and preferably 3-4 times. The thickness of the stretched film is generally 30-80 $\mu$m and preferably 35-45 $\mu$m. Incidentally, the stretched film itself does not show gas permeability, because it contains a large amount of a rubbery polymer (EPDM).

In the present invention, the film adhered to the woven or nonwoven fabric by hot pressing has micropores which penetrate through the film. Therefore, the composite sheet shows good gas permeability. This is due to the fact that the film undergoes heat shrinkage in the hot pressing process. Particularly when the film is stretched in advance, the heat shrinkage of the film is remarkable.

In the production of the heat-resistant, composite sheet of the present invention, a plurality of heating-cooling steps are conducted after the hot pressing of the stretched film to the woven or nonwoven fabric. In this case, from a first heating-cooling step to a subsequent one, a heating temperature should be elevated stepwise, because if the hot-pressed film is heated straight to a high temperature by a single step, it becomes at least partially fluid-like, namely it is at least partially melted, losing its micropores. In the first heating-cooling step, the heating temperature should be lower than the melting temperature of the film. Thus, it is usually 70°–90° C. The heating time is not particularly limited, but if it is too long, the micropores tend to disappear. Accordingly, the heating time is preferably within 60 sec. By this heat treatment, unstable active groups in the resins are stabilized by cross-linking, thereby increasing the heat resistance of the film and also preventing the generation of unacceptable odor.

After heating, the film is cooled to a temperature of 45° C. or less. The preferred cooling temperature is 30° C. or less. The significance of this cooling step is not necessarily clear, but when the subsequent heating step is conducted without cooling, the film tends to lose micropores. Accordingly, the cooling step is indispensable after each heating step.

The heating temperature is elevated stepwise in the subsequent heating-cooling step, and the increment of the heating temperature is generally 50° C. or less. If the heating temperature is elevated by more than 50° C. by a single step, the film is likely to be melted because of insufficient degree of cross-linking. On the other hand, when the increase of the temperature is too small, the overall heat treatment becomes uneconomical. Therefore, the temperature increment from one step to a subsequent one is preferably 20°–40° C. for practical reasons. With this temperature increment, the heating-cooling steps are repeated successively. Incidentally, in each heating-cooling step, he cooling temperature is 45° C. or less, and preferably 30° C. or less.

The number of the heating-cooling steps and the heating temperature in each step may vary depending upon the composition of the stretched film, the type of the woven or nonwoven fabric, but when a fabric made of synthetic fibers such as polyester fibers, nylon fibers, etc. is used, it is preferable to conduct 3 steps of heating and cooling: A first step at 80° C., a second step at 100° C. and a third step at 120° C., each for 60 sec or less, and cooling to 45° C. or less in each step. In the case of using a fabric made of natural fibers such as cotton fibers, it is preferable to conduct 4 steps: A first step at 80° C., a second step at 120° C., a third step at 160° C. and a fourth step at 200° C., each for 60 sec or less and cooling to 45° C. or less in each step.

In addition, in the present invention, after at least one heating-cooling step, electron beam irradiation can be conducted. By this electron beam irradiation, the ethylene-propylene-diene copolymer and the ethylene-vinyl acetate copolymer in the film are further cross-linked, leading to the improvement of the heat resistance of the composite film and the prevention of the generation of odor. In this case, the amount of electron beam irradiated is preferably 5-20 Mad.

In the present invention, cross-linking agents are not used to accelerate the above cross-linking reaction, but the film has as high a gel percentage as 65-95 weight % after cross-linking.

The gas-permeable composite sheet thus cross-linked according to the method of the present invention shows extremely high heat resistance. Accordingly, it cannot be easily sewed or bonded by heat fusion. Thus, the following methods are preferable for bonding:

(1) It is subjected to a cross-linking treatment after bonding and sewing to provide a product shape (for instance, glove) by high-frequency fusion.

(2) Uncross-linked film (for instance, unstretched film) is interposed between the sheets, and this is fused as a bonding layer.

(3) A high-frequency electrode is preheated to conduct fusion. A sheet cross-linked by 5-20 Mrad of electron beam can be completely bonded to each other by heating by a high-frequency electrode mold heated at 130° C. or more.

In this method, the stretched film composed of an ethylene-propylene-diene copolymer and an ethylene-vinyl acetate copolymer and optionally a filler is adhered to fibers of the woven or nonwoven fabric by hot pressing. Microscopically, it is found that a stretched film portion existing in a space between adjacent fibers of the woven or nonwoven fabric is in a state of being fixed by the surrounding fibers. Here, when the heat shrinkage of the stretched film portion takes place, the stretched film portion falls in a state of being stretched by the surrounding fibers because the surrounding fibers themselves are not substantially changed. Accordingly, the micropores are produced in the film particularly at points adjacent to the fibers. In addition, fine gaps are also generated between soft segments and hard segments in the film because of their difference in heat shrinkage. Since the resulting micropores penetrate through the film, the composite sheet having such film becomes sufficiently gas-permeable.

After the hot pressing of the stretched film to the woven or nonwoven fabric, a plurality of heating-cooling steps are repeated with heating temperature elevated stepwise to achieve the cross-linking of the film without causing the melting of the stretched film which leads to the decrease in gas permeability [disappearance of micropores]. By the first heating-cooling step, partial cross-linking takes places, increasing the melting temperature of the film. Accordingly, in the subsequent step, a higher temperature can be applied without causing the melting of the film. As a result, the degree of cross-linking can be increased. Thus, by repeating these heating-cooling steps successively, a sufficient degree of cross-linking can finally be achieved without causing any melting of the film.

In addition, by using the irradiation of electron beam after at least one step of heating and cooling, further cross-linking can be achieved. In this case, odor is somewhat generated because of the scission of the polymer molecule chains, but such problem can be substantially suppressed when electron beam is irradiated in 5-20 Mrad.

FIG. 1 illustrates a typical apparatus suitable for carrying out the adhesion of the stretched film to the woven or nonwoven fabric by hot pressing according to one embodiment of the present invention. This hot pressing apparatus comprises a roll 3 for cooling the stretched film 1 for heat setting, guide rolls 4, 4' for guiding the woven or nonwoven fabrics 2, 2', a metallic heating roll 5, a pressure roll 6 made of a silicone rubber for preventing the sticking of the stretched film 1, and cooling rolls 7, 8. The gap between the heating roll 5 and the pressure roll 6 can be suitably adjusted to impart desired adhesion pressure to a composite sheet being formed. In the present embodiment, the woven or nonwoven fabrics 2, 2' are bonded to both surfaces of the stretched film 1 by hot pressing. Where the composite sheet is desired to have one woven or nonwoven fabric, either one of the woven or nonwoven fabrics 2, 2' should be omitted. On the other hand, where the composite sheet is desired to have one woven or nonwoven fabric interposed between two stretched films, it suffices to simply exchange the positions of the stretched film and the woven or nonwoven fabrics in FIG. 1.

Figure 2:
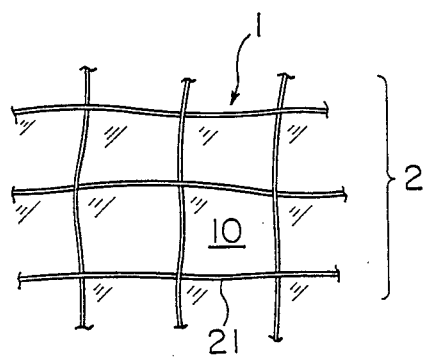
FIG. 2 is an enlarged view showing a film adhered to the woven fabric.

FIG. 2 shows the detail of the gas-permeable composite sheet obtained by hot-pressing the stretched film 1 to the woven or nonwoven fabric 2. Since the stretched film 1 is adhered to the fibers 21 of the woven or nonwoven fabric 2, a stretched film portion 10 existing in a space between the adjacent fibers 21 is in a state of being fixed by the surrounding fibers 21. Here, when the stretched film portion 10 is subjected to heat shrinkage, the stretched film portion 10 is pulled by the surrounding fibers 21 because the positions of the surrounding fibers 21 are not substantially changed.

Figure 3:
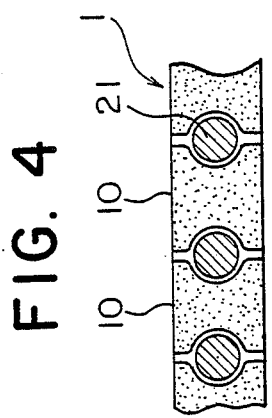
FIG. 3 is an enlarged cross-sectional view showing fibers embedded in the film i one embodiment of the present invention.

FIG. 3 is an enlarged cross-sectional view showing one example of the adhesion state of the stretched film 1 and fibers 21 of the woven or nonwoven fabric 2. Since the fibers 21 are embedded in the film 1, they microscopically serve as fixed frameworks for film portions 10 in the heat shrinkage of the stretched film 1. Thus, fine gaps (micropores) are generated between the fibers 21 and the film portions 10.

Figure 4:
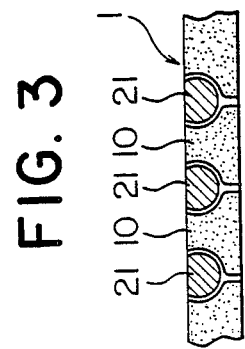
FIG. 4 is an enlarged cross-sectional view showing fibers embedded in the film in another embodiment of the present invention.

FIG. 4 is an enlarged cross-sectional view showing one example of a composite sheet produced by hot pressing of two stretched films to a woven or nonwoven fabric. Similarly in FIG. 3, the fibers 21 microscopically serve as fixed frameworks for film portions 10 at the time of the heat shrinkage of the stretched film 1, causing fine gaps (micropores) between the fibers 21 and the film portions 10, 10'.

Incidentally, the fibers of the woven or nonwoven fabric need not be completely embedded in the film as shown in FIG. 3, and partial embedding of the fibers of the stretched film is sufficient if their adhesion to the film is sufficiently strong.

Figure 5:
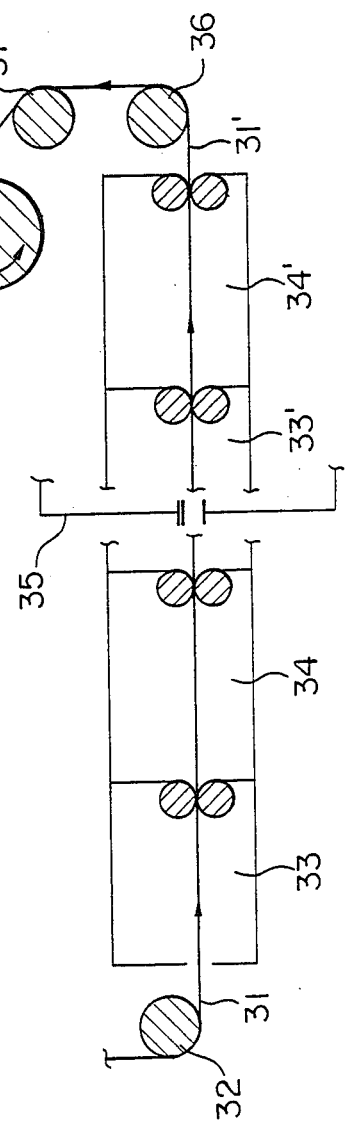
FIG. 5 is a schematic view showing the apparatus for cross-linking the film.

FIG. 5 is a schematic view showing one example of an apparatus suitable for conducting the heating-cooling steps according to the method of the present invention.

A composite sheet 31 composed of the stretched film and the woven or nonwoven fabric produced by hot pressing step shown in FIG. 1 is introduced via a roll 32 into a first heating chamber 33 and then into a first cooling chamber 34. In the heating chamber 33, the composite sheet 31 is heated at a first temperature (for instance, 70°-90° C.), and it is cooled to 45° C. or less in the cooling chamber 34. Next, it is subjected to electron beam irradiation by an electron beam generator 35, and further its heating and cooling is repeated in the subsequent heating chamber 33' and cooling chamber 34'. Finally, the resulting heat-resistant, gas-permeable composite sheet 31' passes through guide rollers 36, 37 and then is wound around a reel 38. Incidentally, two or more heating-cooling steps can be conducted before the electron beam irradiation. Further, after the electron beam irradiation, a plurality of heating-cooling steps can be conducted, or they may be omitted. Further, the electron beam irradiation can be omitted completely only by conducting a plurality of heating-cooling steps.

When the composite sheet is desired to have excellent softness as another feature of the present invention, the film composition desirably comprises 50-68 weight % of an ethylene-propylene-diene copolymer, 30-48 weight % of an ethylene-vinyl acetate copolymer and 2-20 weight % of linear low-density polyethylene. When the content of the ethylene-propylene-diene copolymer (EPDM) is less than 50 weight %, the resulting film does not have sufficiently high elasticity, and when it exceeds 68 weight %, the resulting film does not show sufficient softness. The preferred content of the ethylene-propylenediene copolymer is 55-60 weight %. With respect to the ethylene-vinyl acetate copolymer (EVA), when it is less than 30 weight %, the formability and the softness of the film is low, and when it exceeds 48 weight %, the resulting film is too sticky, making its handling difficult. The preferred content of the ethylene-vinyl acetate copolymer is 35-40 weight %. With respect to the linear low-density polyethylene (LLDPE), when it is less than 2 weight %, sufficient effect of improving the formability of the film cannot be obtained, and when it exceeds 20 weight %, the resulting film does not have sufficient softness and stretchability. The preferred content of the linear low-density polyethylene is 5-10 weight %.

In the case of producing a soft composite sheet, the woven or nonwoven fabric may be the same as explained above. However, production conditions of the soft composite sheet are different from those of the heat-resistant, gas-permeable composite sheet.

Specifically, a composition comprising an ethylene-propylene-diene copolymer (EPDM), an ethylene-vinyl acetate copolymer (EVA), linear low-density polyethylene (LLDPE) and optionally additional components is blended. In this case, the blending is preferably at a resin temperature of 150°-175° C.

After blending, it is formed into a film. The film desirably has a thickness of 10-40 μm. When it is thinner than 10 μm, the film does not have sufficient mechanical strength, and when it exceeds 40 μm, micropores for imparting gas permeability to the film are not easily produced. The formation of the film can be conducted by an inflation method (air-cooling method) at a resin temperature of 120°–165° C. and at a blow ratio (diameter of baffle/diameter of die slit) of 2.5–5.0.

The resulting film is then adhered to a woven or nonwoven fabric by hot pressing at 70°–150° C. Outside the above temperature range, the adhesion of the film to the woven or nonwoven fabric and the heat shrinkage of the film are not sufficient, or high waterproofness cannot be achieved.

In the present invention, this hot pressing needs not be conducted by one step, and to make sure the adhesion of the film to the woven or nonwoven fabric and the production of micropores, it can be conducted by a plurality of steps. In this case, a first step is conducted at a relatively low temperature, and the hot pressing temperature is increased gradually. In a typical example, 3 steps are conducted continuously at 70°–90° C. for a first step, 90°–110° C. for a second step and 110°–150° C. for a third step.

The above hot pressing is preferably conducted under pressure of 0.1–10 kg/cm$^2$. When the pressure is lower than 0.1 kg/cm$^2$, sufficient adhesion of the film to the woven or nonwoven fabric cannot be achieved. On the other hand, when it exceeds 10 kg/cm$^2$, the film strength decreases. The preferred pressure condition is 0.5–5 kg/cm$^2$. With respect to the positional relation between the film and the woven or nonwoven fabric, it may be the same as explained above.

In the composite sheet thus produced, the film is made microporous because of its heat shrinkage by hot pressing. The microporosity may vary more or less depending upon the hot pressing conditions, but the micropores are generally 5 $\mu$m or less in diameter. Accordingly, the composite sheet shows not only excellent gas permeability but also excellent waterproofness.

In the hot pressing step of this method, when the film is heated at 70° C. or more, vinyl acetate in the ethylene-vinyl acetate copolymer (EVA) dispersed in the film becomes sticky, and its stickiness acts to adhere the film to the woven or nonwoven fabric. At the same time, since the film is subjected to heat shrinkage, the film is pulled by the fibers of the woven or nonwoven fabric. This phenomenon is substantially the same as explained above referring to FIG. 2.

Figure 6:
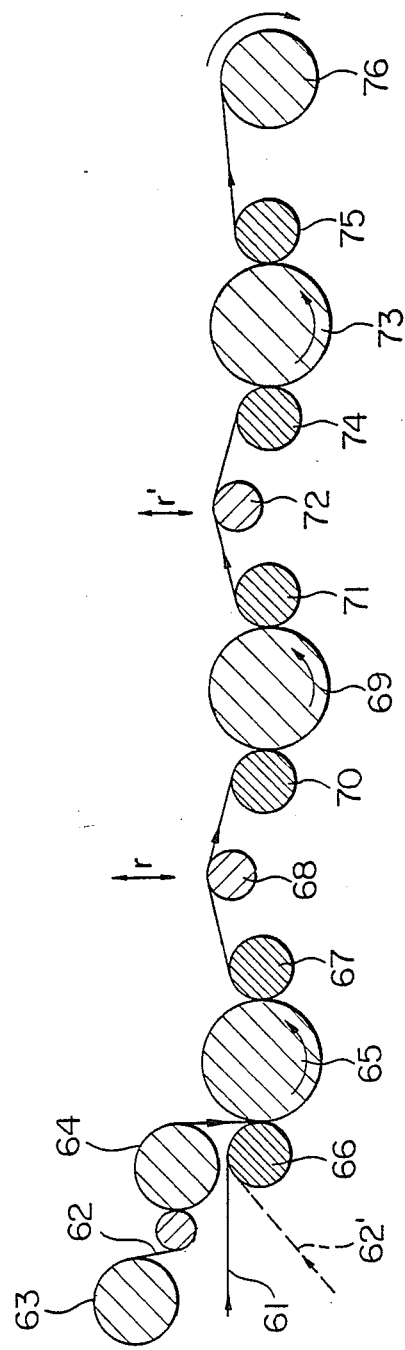
FIG. 6 is a schematic view showing an apparatus for carrying out the method of producing a composite sheet according to another embodiment of the present invention.

FIG. 6 is a schematic view showing one example of an apparatus for carrying out the hot pressing of this method. This hot pressing apparatus comprises a guide roll 63, a preheating roll 64 for heat-setting a woven or nonwoven fabric 62, a hot pressing roll 65 for hot-pressing a film 61 and the woven or nonwoven fabric 62, a pair of elastic rolls 66, 67, a tension control roll 68 for a composite sheet after the first hot pressing step, a second hot pressing roll 69 for hot-pressing the composite sheet again, a pair of elastic rolls 70, 71, a tension control roll 72 for the composite sheet after the second hot pressing step, a third hot pressing roll 73 for hot-pressing the composite sheet again, a pair of elastic rolls 74, 75 and a reel 76.

The temperature of each hot pressing roll is as follows:
First hot pressing roll 65: 70°–90° C.
Second hot pressing roll 69: 90°–110° C.
Third hot pressing roll 73: 110°–150° C.

The temperature of the preheating roll 64 may vary depending upon the type and the thickness of the woven or nonwoven fabric 62, but it is preferably about 120° C. The gap between the hot pressing roll 65 and the elastic rolls 66, 67, the gap between the second pressing roll 69 and the elastic rolls 70, 71, and the gap between the third pressing roll 73 and the elastic rolls 74, 75 can be adjusted to give suitable pressure to the composite sheet being hot-pressed. In addition, by moving vertically the tension control rolls 68, 72 as shown by the arrows r, r', the tension of the composite sheet can be adjusted.

In the case of hot-pressing a single woven or nonwoven fabric 62 onto one side of the film 61, each elastic roll 66, 67, 70, 71, 74, 75 is desirably cooled to keep a temperature of 30° C. or less. On the other hand, in the case of using two woven or nonwoven fabrics, a second woven or nonwoven fabric may be supplied along the broken line 62'. In this case, the elastic rolls 66, 67, 70, 71, 74, 75, need not be cooled.

On the contrary, when the woven or nonwoven fabric is sandwiched by two films, the positions of the film 61 and the woven or nonwoven fabric 62, 62' need only be exchanged.

According to a third embodiment of the present invention, the composite sheet is provided with high stretchability together with excellent gas permeability and waterproofness. In such a case, the composition for forming a film used in the stretchable composite sheet should be composed of 40–70 weight % of an ethylene-propylene-diene copolymer (EPDM) 30–60 weight % of an ethylene-vinyl acetate copolymer (EVA) and 0.1–1.0 parts by weight of an foaming agent per 100 parts by weight of the ethylene-propylene-diene copolymer+the ethylene-vinyl acetate copolymer.

With respect to the ethylene-propylene-diene copolymer (EPDM), when it is less than 40 weight %, the resulting foamed film does not have sufficient elasticity, and when it exceeds 70 weight %, the resulting foamed film is poor in formability and softness. The preferred content of the ethylene-propylene-diene copolymer is 45–65 weight %.

With respect to the ethylene-vinyl acetate copolymer (EVA), when it is less than 30 weight %, the resulting foamed film is poor in formability and softness, and when it exceeds 60 weight %, the film becomes too sticky. The preferred content of the ethylene-vinyl acetate copolymer is 35–55 weight The foaming agent used in the present invention may be a compound which is in a liquid or solid state at room temperature, but is decomposed or evaporated when heated at a film-forming temperature. Any foaming agents having such properties can be used unless they substantially interfere with the formation of the film. Examples of such foaming agents are azodicarbonamide, etc. Commercially available foaming agents are 5001, 5006, NC-100, etc. manufactured by Celltechno. The amount of the foaming agent added to the composition is 0.1–1.0 parts by weight per 100 parts by weight of the resin components (ethylene-propylene-diene copolymer+ethylene-vinyl acetate copolymer).

In the production of the foamed film, the linear low-density polyethylene (LLDPE) can be added to the composition to improve the film-forming properties of the composition, thereby making it easier to form a thinner film from the composition.

When the linear low-density polyethylene (LLDPE) is added, EPDM is 35–65 weight %, EVA is 30–55 weight % and LLDPE is 1–10 weight %. When LLDPE is less than 1 weight %, sufficient effect of improving film-forming properties cannot be obtained. On the other hand, when it exceeds 10 weight %, the resulting foamed film is poor in stretchability and softness. In this case too, the amount of the foaming agent added to the composition is 0.1–1.0 parts by weight per 100 parts by weight of the resin components (ethylene-propylenediene copolymer) ethylene-vinyl acetate copolymer+linear low-density polyethylene). With respect to other additives, they may be the same as explained above.

In the production of the composite sheet by using the foamed film according to this method of the present invention, the ethylene-propylene-diene copolymer (EPDM), the ethylene-vinyl acetate copolymer (EVA) and the foaming agent and optionally the linear low-density polyethylene (LLDPE) are first blended. In this method, the blending is preferably conducted at a resin temperature of 140°–170° C.

After blending, the composition is formed into a film while causing its foaming. The film-forming temperature is generally 120°–170° C. By conducting the formation of the film at such a temperature, the thermal deterioration of the resin can effectively be prevented. Particularly in the present invention, the film-forming temperature is preferably at 140°–175° C. This low-temperature film-forming can be conducted by using a full-flighted screw equipped with deep grooves for preventing heat generation, and then by known methods such as an inflation method using a circular die and a T-die method using a T-die.

The film-forming rate is preferably 15 m/minute or less. When it is higher than 15 m/minute, sufficient foaming cannot be achieved, failing to provide a sufficiently foamed film. The more preferable film-forming rate is 5–10 m/minute.

By conducting the formation of the foamed film under the above conditions, the foaming ratio becomes 1.1–2.0 times. Further, the sizes of the foamed cells in the film are generally 5–100 μm or so, although they may vary more or less depending upon the type and amount of the foaming agent.

The foamed film is then adhered to a stretchable woven or nonwoven fabric. The stretchable fabrics may be any woven or nonwoven fabrics which have sufficient stretchability, such as stretch fabrics, knits, etc. The stretchable woven or nonwoven fabric should not be heat-shrinked or melted in the step of hot pressing. Accordingly, the stretchable woven or nonwoven fabric is required to have a melting point or secondary transition point which are 20° C. or more higher than those of the foamed film.

The hot pressing of the foamed film to the stretchable woven or nonwoven fabric is generally conducted at a temperature of 70°–140° C. and under pressure of 0.1–10 kg/cm$^2$ Although there may be difference depending upon the composition of the foamed film and the type of the stretchable woven or nonwoven fabric, etc., sufficient adhesion between the foamed film and the stretchable woven or nonwoven fabric cannot be obtained outside the above hot pressing condition ranges. Specifically, when the temperature is lower than 70° C., sufficient adhesion of the foamed film cannot be achieved, and when it exceeds 140° C., fine cells produced by foaming are destroyed, namely they disappear, resulting in the decrease in gas permeability. And when the pressure is lower than 0.1 kg/cm$^2$, the foamed film cannot strongly be adhered to the stretchable woven or nonwoven fabric. On the other hand, when it exceeds 10 kg/cm$^2$, the film strength decreases. The preferred hot pressing conditions are 95°–120° C. and 0.5–5.0 kg/cm$^2$.

As will be explained in detail below, the hot pressing of the foamed film to the stretchable woven or nonwoven fabric is preferably conducted by a plurality of steps using a plurality of heat rolls. In this case, the positional relation between the foamed film and the stretchable woven or nonwoven fabric may be the same as explained above.

Next, the foamed film adhered to the stretchable woven or nonwoven fabric by hot pressing is stretched again along the stretchable direction of the fabric (longitudinal direction and/or transverse direction), to produce fine pores penetrating from one side to the other in the foamed film.

The uniaxial or biaxial stretching is preferably 1.2–2.0 times or so, and more preferably 1.5 times or so. The stretching can be conducted at room temperature, but the stretching temperature is generally 35° C. or less.

When the stretching ratio is less than 1.2 times, cells in the foamed film are not broken so that the foamed cells cannot be converted to pores penetrating through the film. When it exceeds 2.0 times, too much breakage takes place in the foamed film, deteriorating the waterproofness of the foamed film.

When the tension is released after the stretching of the composite film, the composite film returns to the original state, thus the gas-permeable, waterproof composite film having excellent stretchability can be obtained.

Incidentally, since both of the foamed film and the stretchable woven or nonwoven fabric have excellent stretchability, the composite film does not lose its gas permeability and waterproofness even by stretching.

Figure 8A:
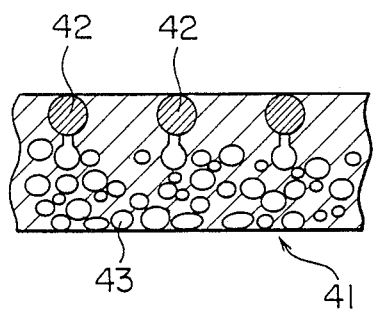
FIG. 8 (a) is an enlarged cross-sectional view showing fibers embedded in the foamed film.
Figure 8B:
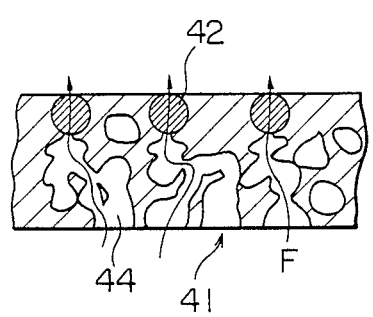

As shown in FIG. 8 (a), the foamed film 41 has a large number of fine cells 43. Thus, when it is stretched uniaxially or biaxially (along the stretchable direction) by 1.2–2.0 times after adhesion to the stretchable woven or nonwoven fabric, fibers 42 of the stretchable woven or nonwoven fabric are also stretched, and walls between the fine cells 43 are broken. Accordingly, adjacent cells 43 are connected to each other as shown in FIG. 8 (b) to form fine penetrating pores 44. These fine penetrating pores 44 permit the air to flow as shown by the arrow F. Thus, the foamed film is provided with gas permeability. However, since fine cells 43 have extremely small diameter, the pores 44 can still prevent the flow of water. Accordingly, the composite film have excellent gas permeability as well as waterproofness.

Figure 7:
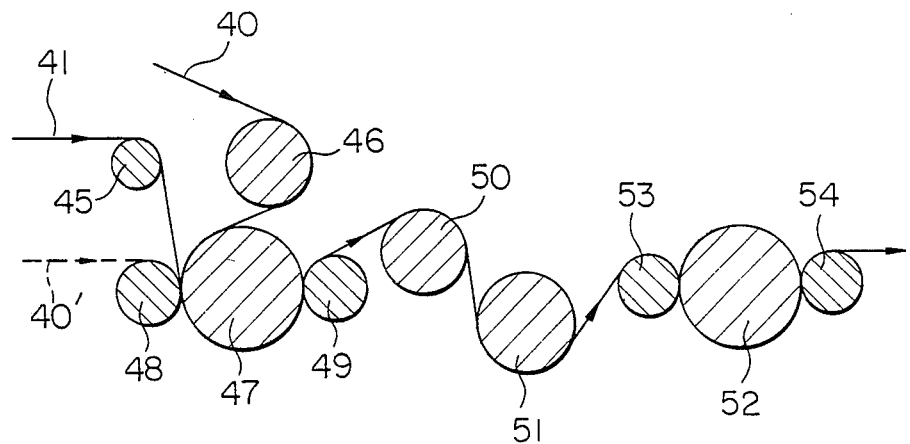
FIG. 7 is a schematic view showing an apparatus for carrying out the method of producing a composite film according to a further embodiment of the present invention.

FIG. 7 is a schematic view showing one example of an apparatus for carrying out the hot pressing of this method. This hot pressing apparatus comprises a roll 45 for heat-setting the foamed film 41, a heat roll 46 for guiding and heating the stretchable woven or nonwoven fabric 40, a metallic roll 47 for hot-pressing the foamed film 41 to the stretchable woven or nonwoven fabric 40, a pair of elastic rolls 48, 49 controlled at 40° C. or less, a roll 50 for cooling the hot-pressed composite sheet, a heat roll 51 for heating the composite sheet, a metallic roll 52 for hot-pressing the composite sheet again, and a pair of elastic rolls 53, 54 controlled at 40° C. or less. The gap between the metallic roll 47 and the elastic rolls 48, 49, and the gap between the metallic roll 52 and the elastic rolls 53, 54 can be adjusted to provide a suitable pressure.

In the preferred example, each roll is at the following temperature:
Heat roll 46: 100°–150° C.
Heat roll 51: 100°–200° C.
Metallic roll 47: 70°–110° C.

Metallic roll 52: 100°–200° C.
Elastic rolls 48, 49, 53, 54: 40° C. or less
Cooling roll 50: 30° C. or less In this example shown in FIG. 7, one foaming film 41 is adhered to one stretchable woven or nonwoven fabric 40 by hot pressing, but when two stretchable woven or nonwoven fabrics are used, another stretchable woven or nonwoven fabric need only be supplied along the line 40'. In this case, the elastic rolls 48, 49, 53, 54 need not be cooled. On the other hand, when it is desired to sandwich one stretchable woven or nonwoven fabric by two foamed films, the positional relation of the foamed film 41 and the stretchable woven or nonwoven fabrics 40, 40' need only be exchanged.

The present invention will be explained in further detail by the following Examples. Incidentally, in the Examples, air permeability was measured as gas permeability.

EXAMPLE 1

A composition consisting of 35 weight % of an ethylene-vinyl acetate copolymer (vinyl acetate content: 28 weight %), 55 weight % of an ethylene-propylene-diene copolymer (Vistalon 3708 produced by Exxon Chemical Japan, Ltd.), and 10 weight % of talc (average particle diameter: 5 μm) was melted and kneaded in a double-screw extruder. The resultant blend was formed into a film by a water-cooled inflation method. The produced film of 120 μm in thickness was heated at 50° C., and at the same time, uniaxially stretched by 3 times to produce a stretched film. This stretched film showed substantially no air permeability.

The stretched film and a plain weave fabric made of a mixture of polyester fibers and nylon fibers (basis weight: 18 g/m², manufactured by Toyobo Co., Ltd.) were fed at a rate of 5 m/minute to an apparatus as illustrated in FIG. 1, and subjected to hot pressing at a temperature of 110° C. from the fabric side under pressure of 5 kg/cm².

Next, the resulting composite sheet was heated at 80° C. for 30 sec and then cooled to 30° C. It was reheated at 100° C. for 30 sec and then cooled to 30° C. It was again reheated at 120° C. for 30 sec and then cooled to 30° C.

The composite sheet thus heat-treated was measured with respect to basis weight, air permeability and heat resistance. The results are shown in Table 1.

EXAMPLE 2

Example 1 was repeated except for using a cotton fabric (33 g/m²) as a fabric and conducting, after hot pressing, the following heating-cooling steps:
First step: heating at 80° C. for 60 sec and cooling to 30° C.;
Second step: heating at 120° C. for 60 sec and cooling to 30° C.;
Third step: heating at 160° C. for 60 sec and cooling to 30° C.;
Fourth step: heating at 200° C. for 60 sec and cooling to 30° C.

The composite sheet produced under the above conditions was subjected to the same measurements as in Example 1. The results are shown in Table 1.

EXAMPLE 3

Example 2 was repeated except for using a gauze (30 g,/m²) instead of a cotton fabric, and the same measurements were carried out as in Example 1. The results are shown in Table 1.

EXAMPLE 4

The film obtained in Example 1 was stretched biaxially by 3.0 times × 3.0 times at 50° C. and the resulting stretched film was sandwiched by the cotton fabric used in Example 2 and a polyester fabric and hot-pressed under the same conditions as in Example 1.

Next, the heating-cooling steps were conducted under the same conditions as in Example 2 to cross-link the film. The resulting composite sheet was measured with respect to basis weight, air permeability and heat resistance. The results are shown in Table 1.

EXAMPLE 5

The composite sheet hot-pressed in Example 1 was subjected to heat treatment at 80° C. for 60 sec and then irradiated with electron beam of 10 Mrad to produce a heat-resistant, air-permeable composite sheet. The same tests were conducted as in Example 1, and the results are shown in Table 1. Incidentally, in the irradiation step of electron beam, the generation of unacceptable odor was not observed.

EXAMPLE 6

A composition of EPDM/EVA (weight ratio: 60/40) was blended in a molten state in a double-screw extruder, and formed into an inflation film. The resulting 80-μm-thick film was uniaxially stretched by 4.5 times while heating at 50° C. to provide a 35-μm-thick stretched film. This stretched film showed no air permeability. Then, this stretched film was fed to the apparatus shown in FIG. 1 together with a plain weave fabric of 100% cotton (manufactured by Toyobo Co., Ltd., basis weight: 80 g/m²) at a rate of 5 m/minute, and hot-pressed at 125° C. on the fabric side and at 95° C. on another roll on the film side, under pressure of 8 kg/cm².

Next, it was heated at 100° C. for 30 sec and cooled at 30° C. for 30 sec. It was then irradiated with electron beam of 10 Mrad. The composite sheet thus treated had properties as shown in Table 1.

TABLE 1

| Example No. | Stretch Ratio | Type of Fabric | Basis Weight (g/m²) | Air[1] Permeability (Sec) |
|---|---|---|---|---|
| 1 | 3.0 | Fabric of[2] mixed fibers | 230 | 150 |
| 2 | 3.0 | 100% Cotton fabric | 120 | 40 |
| 3 | 3.0 | Gauze | 150 | 30 |
| 4 | 3.0/3.0 | Cotton fabric and polyester fabric[3] | 260 | 300 |
| 5 | 3.0 | Fabric of[4] mixed fibers | 200 | 60 |
| 6 | 4.5 | 100% Cotton Fabric[5] | 110 | 60 |

| Example No. | Heat Resistance[6] 150° C. | 200° C. | 250° C. | Ignition Temp. (°C.) |
|---|---|---|---|---|
| 1 | O | Δ | X | 200 |
| 2 | O | O | Δ | 265 |
| 3 | O | O | Δ | 350 |
| 4 | O | O | Δ | 265 |
| 5 | O | Δ | X | 200 |

TABLE 1-continued

| | 6 | O | O | Δ | 280 |
|---|---|---|---|---|---|

Note [1] Expressed by the time (sec) necessary for 100 cc of the air to pass through a circular area (645.16 mm$^2$) of a composite sheet sample.
[2] Polyester fibers + nylon fibers.
[3] Sandwich structure of cotton fabric/stretched film/polyester fabric.
[4] Polyester fibers + nylon fibers.
[5] Hot-pressed to EPDM/EVA (60/40) film.
[6] Evaluated by observing what change took place in 60 sec on a composite sheet sample placed 2.0 cm apart from a heater at each temperature with its film side toward the heater. O: No change Δ: Discolored (fabric portion scorched) X: Burned (fabric portion burned)

COMPARATIVE EXAMPLE 1

Example 1 was repeated except for heating the composite film straight to 120° C. to carry out the cross-linking of the film. The resulting composite sheet completely lost air permeability.

COMPARATIVE EXAMPLE 2

A composite sheet was produced under the same conditions as in Example 1 except for conducting electron beam irradiation at 20 Mrad after the hot pressing of the stretched film to the fabric and before the first heating-cooling step. The resulting composite sheet showed substantially the same air permeability and heat resistance as in Example 1, but it generated strong acetic acid odor in the step of electron beam irradiation.

EXAMPLE 7

A composition of 40 weight % of an ethylene-vinyl acetate copolymer (vinyl acetate content: 28 weight %), 60 weight % of an ethylene-propylene-diene copolymer (Vistalon 3708 manufactured by Exxon Chemical Japan, Ltd.) and 0.5 parts by weight, per 100 parts by weight of the resin components, of a foaming agent (NC-1000 manufactured by Celltechno) was blended in a molten state in an extruder and formed into a film while being foamed simultaneously by an inflation method at a resin temperature of 120° C. and at a film-forming rate of 5 m/minute. The resulting foamed film had a thickness of 120 μm, and the foaming ratio was about 1.2 times.

This foamed film was overlapped with a stretchable fabric (biaxially stretchable fabric manufactured by Toyobo Co., Ltd.), and hot-pressed at a press temperature of 90° C. and pressure of 5 kg/cm$^2$ for 20 sec.

The resulting composite film was biaxially stretched by 1.5 times and then a stretching force was released. The resulting composite film was measured with respect to waterproofness and air permeability. The results are shown in Table 2.

EXAMPLE 8

A composition of 57 weight % of the ethylene-propylene-diene copolymer, 38 weight % of the ethylene-vinyl acetate copolymer both used in Example 1, 5 weight % of linear low-density polyethylene (TUF-2060 manufactured by Nippon Unicar Co., Ltd., density: 0.920, melt index: 2.2) and 0.8 parts by weight, per 100 parts by weight of the above resin components, of a foaming agent (5001 manufactured by Celltechno) was blended in a molten state and formed into a foamed film of 60 μm in thickness at a foaming ratio of 1.5 times in the same manner as in Example 7.

This foamed film was overlapped with a stretchable fabric (longitudinally stretchable fabric manufactured by Toyobo Co., Ltd.), and hot-pressed under the same conditions as in Example 7. The resulting composite film was stretched longitudinally (in the machine direction) by 1.5 times, and then a stretching force was released. The resulting composite film was measured with respect to waterproofness and air permeability. The results are shown in Table 2.

EXAMPLE 9

A foamed film was produced in the same manner as in Example 7 except for changing the amount of the foaming agent to 1.0 part by weight. The resulting foamed film had a thickness of 160 μm, and the foaming ratio was 1.8 times. With this foamed film and a stretchable polyester unwoven fabric, a composite film was produced in the same manner as in Example 7 except for stretching uniaxially [in the transverse direction) by 1.5 times. The resulting composite film was measured with respect to waterproofness and air permeability, and the results are shown in Table 2.

COMPARATIVE EXAMPLES 3-5

Composite films were produced in the same manner as in Examples 7-9 except for omitting the stretching step, and the same measurements as in Example 7 were conducted. The results are shown in Table 2.

COMPARATIVE EXAMPLE 6

Example 7 was repeated except for adding no foaming agent to produce a composite film, which was stretched by 1.5 times, and then a stretching force was released. The resulting composite film was measured as in Example 7. The results are shown in Table 2.

TABLE 2

| No. | Water-[1] Proofness (mmH$_2$O) | Air Permeability[2] (ml/cm$^2$ · sec · mmHg) | Evaluation[3] |
|---|---|---|---|
| Example 7 | 100 or more | 1.0 or more | O |
| Example 8 | 100 or more | 1.0 or more | O |
| Example 9 | 100 or more | 1.0-0.5 | O |
| Comparative Example 3 | 100 or more | Almost zero | X |
| Comparative Example 4 | 100 or more | Almost zero | X |
| Comparative Example 5 | 100 or more | Almost zero | X |
| Comparative Example 6 | No | Large permeability because of large pores generated by film breakage | X |

Note [1] Measured according to JIS-L-1092
[2] Measured according to JIS-L-81117
[3] O: Good X: Poor As is clear from Table 2, by stretching the composite sheet after the film is foamed, the composite sheet consisting of the foamed film and the stretched woven or nonwoven fabric can be provided with good air permeability while retaining high waterproofness. On the other hand, if stretching is conducted without foaming, the unfoamed film is broken locally, resulting in extreme decrease in waterproofness (Comparative Example 6).

EXAMPLE 10

A composition consisting of 55.5 weight % of an ethylene-propylene-diene copolymer (Vistalon 3708 manufactured by Exxon Chemical Japan, Ltd.), 37 weight % of an ethylene-vinyl acetate copolymer (DQDJ-3269 manufactured by Nippon Unicar Co., Ltd.) and 7.5 weight % of linear low-density polyethylene (TUF-2060 manufactured by Nippon Unicar Co., Ltd.) was blended in a molten state in an extruder, and formed into a film by an inflation method under the following conditions:

Die diameter: 150 mm
Temperature: 145°–165° C.
Extrusion rate: 40–60 kg/hour
Drawing rate. 10–20 m/minute The resulting film had a thickness of 15–30 μm, and the blow ratio was 3.0–4.0.

This film and a stretchable nonwoven polyester fabric were hot-pressed by an apparatus having two hot pressing rolls under the following conditions:

First hot pressing roll; 80°–90° C.
Second hot pressing roll: 110°–130° C.
Pressing rate 10–25 m/minute The adhesion strength of the resulting composite sheet was investigated, and it was found that there was no problem of peeling. Further, the composite sheet had sufficient elongation at rupture (tear strength) in the longitudinal direction. Its waterproofness, air permeability, moisture permeability and softness were measured. The results are shown in Table 3.

COMPARATIVE EXAMPLE 7

With respect to a waterproof sheet used in commercially available disposable diapers, the same measurements as in Example 10 were conducted on waterproofness, air permeability, moisture permeability and softness. The results are shown in Table 3.

TABLE 3

|  | Example 10 | Comparative Example 7 |
|---|---|---|
| Waterproofness (mmHg)[1] | 1000–500 | 2000 or more |
| Air Permeability[2] (cc/cm$^2$ · sec · mmHg) | 0.5–0.01 | — |
| Moisture Permeability[3] (g/m$^2$ · day) | 1250–4500 | 300–650 |
| Softness[4] | O | Δ |

Note: [1]Waterproofness Measured by Permeagraph (manufactured by Toyoseiki K.K.) in which differential pressure applied to a sample was gradually increased. The waterproofness is expressed by a pressure at which the air permeability changed drastically, namely air-permeable pores were destroyed.
[2]Air permeability Measured by Permeagraph to determine a point where the differential pressure applied to a sample and the amount of air passing through the sample became constant. The air permeability is expressed by the amount of air passing through the sample per a unit area and unit pressure for unit time.
[3]Moisuure permeability Measured according to JIS-Z-0208.
[4]Softness Evaluated by touch sensed by direct contact with a hand. O: Good Δ: Fair As is clear from the results shown in Table 3, the composite sheet produced by the method of the present invention has excellent waterproofness, air permeability, moisture permeability and softness.

As described above, in the method of producing a gas-permeable, waterproof composite sheet according to the present invention, the heat shrinkage of the film is caused during the hot pressing step, thereby making the film microporous. The film is made of a composition comprising an ethylene-propylene-diene copolymer, an ethylene-vinyl acetate copolymer and if necessary, linear low-density polyethylene. Accordingly, the composite sheet has excellent gas permeability and waterproofness without giving a paper-like touch. In addition, since it is supported by a woven or nonwoven fabric, its mechanical strength is extremely high.

The gas permeability of the composite sheet can be adjusted by controlling the hot pressing temperature and pressure. In addition, since thickness variation of the composite sheet can be made minimum, which is difficult in conventional stretching methods, it shows high quality as a waterproof, gas-permeable sheet.

Such composite sheet is suitable for disposable diapers, sports wear, etc. requiring waterproofness and gas permeability.

When the composite sheet is subjected to a plurality of heating-cooling steps with heating temperature elevated stepwise, after hot pressing of a stretched film to a woven or nonwoven fabric, the composite sheet can be provided with high heat resistance because of the cross-linking of the film. This heat-resistant composite sheet can withstand a heat at 200° C. or more. Accordingly, it is not easily burned or scorched even by direct contact with a lighted cigarette. Further, the method of the present invention can produce the heat-resistant composite sheet without generating unacceptable odor which tends to be generated by electron beam irradiation. Even though electron beam irradiation may be conducted in the method of the present invention, it is conducted after at least one heating-cooling step. Therefore, the problem of generating an odor is not substantially caused.

Since the heat-resistant composite sheet contains a large amount of a rubbery polymer (EPDM), it shows not only excellent gas permeability, waterproofness and heat resistance but also excellent softness.

Such heat-resistant, gas-permeable, waterproof composite sheet can be used for various clothes such as fireproof clothes, protective working clothes, etc., interiors of automobiles and aircrafts, housing materials such as wall papers, interior goods such as carpets, table cloths, etc.

Further, when a foamed film and a stretchable woven or nonwoven fabric are used in combination, the composite sheet can be provided with micropores for permitting a gas to flow therethrough by stretching the hot-pressed composite sheet. In this case, the resulting composite sheet is highly stretchable while retaining excellent gas permeability, waterproofness and softness. Therefore, even though it is subjected to repeated stretching, it does not lose its own gas permeability and waterproofness.

The desired gas permeability and waterproofness can be achieved by properly adjusting the foaming ratio of the film and the stretching ratio of the composite sheet. This stretchable composite sheet too is highly suitable for disposable diapers, sports wear, etc. which are often subjected to large stretching.

What is claimed is:

1. A method of producing a waterproof, gas-permeable composite sheet comprising the steps of:
   (a) preparing a film from a composition comprising 40–70 weight % of an ethylene-propylene-diene copolymer and 30–60 weight % of an ethylene-vinyl acetate copolymer; and
   (b) adhering said film to a woven or nonwoven fabric by hot pressing while causing the heat shrinkage of said film simultaneously, thereby making said film microporous.

2. The method according to claim 1, wherein said hot pressing is conducted at a temperature of 70°–150° C.

3. A method of producing a waterproof, gas-permeable composite sheet comprising the steps of:
   (a) preparing a film from a composition comprising 35–68 weight % of an ethylene-propylene-diene copolymer, 30–55 weight % of an ethylene-vinyl acetate copolymer and 1–20 weight % of linear low-density polyethylene; and (b) adhering said film to a woven or nonwoven fabric by hot pressing at a temperature of 70°–150° C. while causing the heat shrinkage of said film simultaneously, thereby making said film microporous.

4. The method according to claim 3, wherein said ethylene-propylene-diene copolymer is 50–68 weight %, said ethylene-vinyl acetate copolymer is 30–48 weight % and said linear low-density polyethylene is 2–20 weight %.

5. The method according to claim 4, wherein the hot pressing of said film to said woven or nonwoven fabric is conducted by three steps consisting of a first step at 70°–90° C., a second step at 90°–110° C. and a third step at 110°–150° C.

6. The method according to claim 4 or 5, wherein said film has a thickness of 10–40 μm.

7. A method of producing a heat-resistant, gas-permeable composite sheet comprising the steps of:

(a) stretching a film made of an ethylene-propylene-diene copolymer and an ethylene-vinyl acetate copolymer uniaxially or biaxially;

(b) adhering the resulting stretched film to a woven or nonwoven fabric by heat pressing while causing the heat shrinkage of the stretched film simultaneously, thereby making said film microporous: and (c) repeating a plurality of steps of heating said film at such a temperature that said film is not melted and then cooling it, the heating temperature being elevated stepwise from one step to a subsequent step, thereby causing the cross-linking of said film while retaining the microporosity of said film.

8. The method according to claim 7, wherein said film is made of a composition comprising 40–70 weight % of an ethylene-propylene-diene copolymer, and 60–30 weight % of an ethylene-vinyl acetate copolymer.

9. The method according to claim 7, wherein said film is made of a composition comprising 40–70 weight % of an ethylene-propylene-diene copolymer, 30–60 weight % of an ethylene-vinyl acetate copolymer and 5–15 weight % of a filler.

10. The method according to any of claims 7–9, wherein said film is stretched by 1.5 times or more uniaxially or biaxially before hot pressing.

11. The method according to claim 7, wherein the hot pressing of said stretched film to said woven or nonwoven fabric is conducted by using a heat roll.

12. The method according to claim 7, wherein said hot pressing is conducted at 80°–150° C. on the side of said woven or nonwoven fabric and at 75°–5° C. on the side of said stretched film, under a hot pressing pressure of 1.0–10 kg/cm².

13. The method according to claim 7, wherein in a plurality of said heating-cooling steps, the heating temperature is elevated stepwise by 50° C. or less from one step to a subsequent step.

14. The method according to claim 13, wherein the cooling temperature in each of said heating-cooling steps is 45° C. or less.

15. A method of producing a heat-resistant, gas-permeable composite sheet comprising the steps of:

(a) stretching a film made of an ethylene-propylene-diene copolymer and an ethylene-vinyl acetate copolymer uniaxially or biaxially;

(b) hot-pressing the resulting stretched film to a woven or nonwoven fabric to adhere them while simultaneously causing the heat shrinkage of said stretched film, thereby making said film microporous:

(c) conducting at least one step of heating said film at such a temperature that said film is not melted and then cooling it: and (d) irradiating electron beam of 5–20 Mrad to said film to cause the further cross-linking of said film.

16. The method according to claim 15, wherein said film is made of a composition comprising 40–70 weight % of an ethylene-propylene-diene copolymer and 60–30 weight % of an ethylene-vinyl acetate copolymer.

17. A method of producing a stretchable, waterproof, gas-permeable composite sheet comprising the steps of:

(a) preparing a foamed film from a composition comprising 40–70 weight % of an ethylene-propylene-diene copolymer, 30–60 weight % of an ethylene-vinyl acetate copolymer, and 0.1–1.0 parts by weight of a foaming agent per 100 parts by weight of said ethylene-propylene-diene copolymer + said ethylene-vinyl acetate copolymer:

(b) adhering said foamed film to a stretchable woven or nonwoven fabric by hot pressing; and (c) stretching the resulting composite sheet along the stretchable direction of said stretchable woven or nonwoven fabric, thereby providing said foamed film with micropores penetrating therethrough.

18. A method of producing a stretchable, waterproof, gas-permeable composite sheet comprising the steps of:

(a) preparing a foamed film from a composition comprising 35–65 weight % of an ethylene-propylene-diene copolymer, 30–55 weight % of an ethylene-vinyl acetate copolymer, 1–10 weight % of linear low-density polyethylene, and 0.1–1.0 parts by weight of a foaming agent per 100 parts by weight of said ethylene-propylene-diene copolymer + by weight of said ethylene-propylene-diene said ethylene-vinyl acetate copolymer + said linear low-density polyethylene;

(b) adhering said foamed film to a stretchable woven or nonwoven fabric by hot pressing; and (c) stretching the resulting composite sheet along the stretchable direction of said stretchable woven or nonwoven fabric, thereby providing said foamed film with micropores penetrating therethrough.

19. The method according to claim 17, wherein the formation of said foamed film is conducted at a resin temperature of 120°–170° C. and at a film-forming rate of 15 m/minute or less, and then the hot pressing is conducted at a temperature of 70°–140° C. and at a pressure of 0.1–10 kg/cm².

20. The method according to claim 18, wherein the formation of said foamed film is conducted at a resin temperature of 120°–170° C. and at a film-forming rate of 15 m/minute or less, and then the hot pressing is conducted at a temperature of 70°–140° C. and at a pressure of 0.1–10 kg/cm².

21. The method according to claim 17, wherein said hot pressing is conducted by a plurality of hot pressing steps.

22. The method according to claim 18, wherein said hot pressing is conducted by a plurality of hot pressing steps.

23. The method according to claim 17, wherein said stretchable woven or nonwoven fabric adhered to said foamed film is stretched by 1.2–2.0 times to produce said micropores.

24. The method according to claim 18, wherein said stretchable woven or nonwoven fabric adhered to said foamed film is stretched by 1.2–2.0 times to produce said micropores.

* * * * *